United States Patent [19]

Mack et al.

[11] Patent Number: 4,478,952

[45] Date of Patent: Oct. 23, 1984

[54] SUPPORTED CATALYST FOR OLEFIN POLYMERIZATION

[75] Inventors: Mark P. Mack; Charles T. Berge, both of Ponca City, Okla.

[73] Assignee: E. I. du Pont de Nemours and Company, Wilmington, Del.

[21] Appl. No.: 476,906

[22] Filed: Mar. 18, 1983

[51] Int. Cl.$^3$ .......................... C08F 4/64; C08F 4/62; C08F 4/68

[52] U.S. Cl. ..................................... 502/110; 502/104; 502/115; 502/116; 502/119; 502/113; 502/117

[58] Field of Search ............... 502/104, 110, 115, 116, 502/119, 113, 117

[56] References Cited

U.S. PATENT DOCUMENTS

| | | | |
|---|---|---|---|
| 4,172,050 | 10/1979 | Gessell | 502/115 |
| 4,224,186 | 9/1980 | Lowery et al. | 502/115 |
| 4,276,191 | 6/1981 | Karayannis et al. | 502/115 |
| 4,314,912 | 2/1982 | Lowery et al. | 502/119 X |

*Primary Examiner*—Patrick Garvin

[57] ABSTRACT

A method for the preparation of supported Ziegler-Natta catalysts comprising contacting a transition metal alkoxide and/or siloxide compound with a magnesium-containing reagent. The magnesium reagent is prepared in the presence of a magnesium chloride support utilizing an anhydrous and oxygen-free mixture of magnesium halide and magnesium metal, slurried in a hydrocarbon solvent. A halogenated hydrocarbon is added to produce the magnesium-containing reagent. Thereafter the transition metal alkoxide and/or siloxide compound is mixed with the slurry. An alkylating agent is added to form an active supported olefin polymerization catalyst.

15 Claims, No Drawings

SUPPORTED CATALYST FOR OLEFIN POLYMERIZATION

This invention relates to olefin polymerization catalysts, catalyst supports, a process for preparing said olefin polymerization catalysts, and a process for polymerizing olefins. More specifically, this invention relates to a method for forming a supported activated catalyst suitable for olefin polymerization comprising contacting a transition metal alkoxide and/or siloxide with a magnesium-containing reagent which is prepared in the presence of a magnesium halide support.

Widespread commercial polymerization of olefins such as ethylene, propylene and 1-butylene are carried out in the presence of metallic catalysts, particularly the reaction products of organometallic compounds and transition metal compounds, to form substantially unbranched polymers of relatively high molecular weight. Typically, such polymerizations are carried out at relatively low temperatures and pressures. The resulting linear olefin polymers (e.g., high density polyethylene) are characterized by great stiffness and higher density than olefin polymers having highly branched chains.

Among the most widely utilized catalysts for producing linear olefin polymers are those initially described by Ziegler in U.S. Pat. Nos. 3,113,115 and 3,257,332. These patents teach catalysts obtained by admixing a compound of a transition metal of groups IVb, Vb, VIb, VIIb, and VIII of Mendeleev's Periodic Table of Elements with an organometallic compound. Commercially, the halides and oxyhalides of titanium, vanadium, and zirconium are the most widely used transition metal compounds. Common examples of the organometallic compounds include hydrides, alkyls and haloalkyls of aluminum, alkyl aluminum halides, Grignard reagents, alkali metal aluminum hydrides, alkali metal borohydrides, alkaline earth metal hydrides, alkali metal hydrides and the like.

In commercial reactions, polymerization is carried out in a reaction medium comprising an inert organic liquid such as an aliphatic hydrocarbon and the catalysts of Ziegler. These catalysts when promoted with co-catalysts, are normally referred to as Ziegler-Natta catalysts and are the catalysts commonly used in commercial operations. One or more olefins are brought into contact with the catalyst and polymerization is allowed to proceed. Normally a molecular weight regulator such as hydrogen is present in the reaction vessel to control the molecular weight of the polymer formed.

After polymerization is complete, catalyst residue can be removed from the polymer by separating the polymer from the inert liquid diluent and repeatedly treating the polymer with an alcohol or similar deactivating agent. The catalyst deactivation and/or removal procedures are expensive both in time and material as well as equipment, but are necessary if the catalyst residues are high in order to avoid degradation of the resulting polymer.

Most commercial systems employ a heterogeneous catalyst, where the catalyst is insoluble in the polymerization diluent. In forming catalysts of this type a transition metal is often reduced by a metal, metal alkyl or metal alkyl halide. In some cases the reducing agent becomes the support material when oxidized by reaction with a transition metal compound. Reduction of the transition metal compound by this method is important in that the reduced transition metal compound is surrounded by, or highly diluted in, the support material. The results is a highly dispersed transition metal compound on the supporting material.

It would therefore be highly desirable to provide a method for the formation of an olefin polymerization catalyst which allows a dispersion of the freshly prepared magnesium reagent within the support material. Such a process would provide a highly active catalyst by a convenient method.

It is therefore an object of the present invention to provide an improved method for obtaining an olefin polymerization catalyst. Other objects will become apparent to those skilled in the art as the description proceeds.

It has now been discovered according to the present invention that a highly active supported olefin polymerization catalyst can be formed by a method comprising contacting a mixture of magnesium metal and magnesium halide with alkyl halides and/or aryl halides to form an organometallic substance in-situ, adding a transition metal alkoxide and/or siloxide followed by addition of an alkylating agent. More specifically, the method comprises a) reacting magnesium metal with organic halide or halides to yield a dialkyl magnesum composition which is liquid or soluble in hydrocarbons and contains magnesium dihalide and unreacted magnesium metal; b) separating the magnesium dihalide and magnesium metal from the dialkyl magnesium composition in the substantial absence of oxygen and moisture, then treating the magnesium dihalide and magnesium metal with alkyl halides or aryl halides or mixtures of these to form an organometallic substance in situ; c) adding transition metal alkoxides and/or siloxides to the mixture of (b) or alternatively adding the mixture of (b) to transition metal alkoxides and/or siloxides, allowing reaction to occur, then d) adding alkylating agents to form a polymerization catalyst.

We have described supported polymerization catalysts utilizing transition metal halides in step (c) in U.S. Pat. No. 4,371,455. Of these two alternative methods, it is preferred that the slurry of (b) be added to the transition metal compound, since this method allows more control over the extent to which the transition metal compound contacts the magnesium reagent.

Optionally but not critically, after completion of the reaction in step (c) the solid catalyst can be washed several times with a liquid hydrocarbon to remove any unreacted quantities of reactants in the hydrocarbon soluble reaction products. Whenever desired, an aluminum alkyl co-catalyst used in step (d) can be employed by either adding to the catalyst or by adding separately to the polymerization reactor.

The catalyst provided in the present invention is most effective in polymerization processes utilizing alpha-olefins in polymerization reactions containing an inert diluent carried out under an inert atmosphere, relatively low temperature and pressure.

Olefins which are suitably polymerized or copolymerized in the practice of this invention are generally aliphatic alpha-olefins having from 2 to 24 carbon atoms. Representative of such alpha-olefins are ethylene, propylene, butene-1, pentene-1, 4-methyl-pentene-1,3-methyl-butene-1, octene-1, decene-1, hexene-1, octadecene-1, and the like. It is well known that alpha-olefins may be copolymerized with other alpha-olefins and/or with other ethylenically unsaturated monomers such as butadiene, pentadiene, styrene, isoprene, alpha-methyl styrene, and similar ethylenically unsaturated monomers which do not destroy conventional Ziegler catalysts. Most benefits are realized in the polymerization of aliphatic alpha-monoolefins, especially ethylene and mixtures of ethylene in combination with up to about 20 weight percent of propylene, butene-1, octene-1, hexene-1, or other higher alpha-olefins based on the total monomer in the resultant polymer.

A preferred method of carrying out the process of the present invention is carrying out step (b) of the method in the presence of excess alkyl halides or aryl halides. Since excess quantities of alkyl halides and/or aryl halides will affect subsequent steps in the catalyst synthesis, when such excess materials are used, unreacted material must be removed as hereinafter described. These materials can be removed whenever convenient after step (b); however, these materials must be removed before step (d) in order to avoid adverse affects on catalytic activity and polymer properties.

In carrying out the method of the present invention, the magnesium metal used can be commercial grade magnesium turnings or shavings. It is preferred that a high surface area magnesium be utilized which can be obtained by milling magnesium to a finely divided state. An example of a suitable state is a powder having a particle size of less than about 150 microns.

In carrying out the method of the present invention, step (a) is carried out by preparing a mixture of hydrocarbon soluble dialkyl magnesium compounds and undissolved solids containing magnesium dichloride and magnesium metal. Excess magnesium metal is reacted with materials such as ethyl chloride and with n-butyl chloride, either simultaneously or stepwise. This material, however, may be obtained commercially from Texas Alkyls, Inc. Deerpark, Texas. Preparation of this material in any event is described in British Pat. No. 1,568,435. This patent clearly shows that two independently insoluble dialkyl magnesiums may solubilize one another.

Any organic halide which is used to step (a) of the process of the present invention must result in the formation of a dialkylmagnesium compound which is liquid and/or hydrocarbon soluble. Dialkyl magnesium compounds with straight chain alkyl groups of 5 carbon atoms and higher are soluble in solvents (*Journal of Organometallic Chemistry*, Volume 5, page 477, 1967; *Journal of Organometallic Chemistry*, Volume 64, page 25, 1974). Likewise, British Pat. No. 1,568,435 described hydrocarbon soluble organomagnesium compounds containing straight chain alkyl group of less than 5 carbon atoms such as di-n-butyl magnesium and diethyl magnesium in an n-butyl to ethyl ratio of from 0.25 to 1 to about 4 to 1. Further, U.S. Pat. No. 4,127,507 describes soluble straight chain di(lower alkyl) magnesium compositions. These materials are all useful in the practice of the present invention when liquid or hydrocarbon soluble. Some dialkyl or diaryl magnesium compounds falling within the description given are not liquid or hydrocarbon soluble, and are not useful in the present invention until they are rendered liquid or hydrocarbon soluble, such as by the methods described.

Representative but non-exhaustive examples of halides suitable for step (a) of the method of the present invention are selected from the group consisting of allyl bromide, allyl chloride, benzyl bromide, benzyl chloride, 1-bromobutane, 2-bromobutane, 1-bromodecane, 2-bromodecane, bromoethane, 1-bromoheptane, 1-bromohexane, 1-bromopentane, 2-bromopentane, 1-bromopropane, 2-bromopropane, 1-chlorobutane, 2-chlorobutane, 1-chlorodecane, 1-chlorooctane, 1-chloropropane, 2-chloropropane, 1-iodobutane, m-bromoanisole, o-bromoanisole, 9-bromoanthracene, 4-bromotoluene, 2-bromo-m-xylene, 4-bromo-m-xylene, 2-bromo-p-xylene, 3-bromo-o-xylene, 4-bromo-o-xylene, chlorobenzene, cyclopentylbromide, cyclopentylchloride, and cyclopropylbromide. These halides may not form liquid or hydrocarbon soluble dialkyl magnesium compounds when used alone, but these compounds can be made liquid or hydrocarbon soluble by mutual solubilization, as described in British Pat. No. 1,468,435.

In step (b) of the present method, magnesium dihalide and magnesium metal are separated from the dialkyl magnesium composition in the substantial absence of oxygen and moisture. These solids can be separated by filtration. Alternatively, the supernatant can be decanted from the material, since the magnesium dichloride and magnesium metal solids usually settle when stirring is discontinued.

Therefore, the preferred method of separation is filtration, followed by washing the solids with an inert hydrocarbon in the substantial absence of oxygen and moisture. Suitable hydrocarbons are aliphatic, cycloaliphatic and aromatic hydrocarbons. Representative but non-exhaustive examples of such hydrocarbon are n-pentane, iso-pentane, n-hexane, normal heptane, n-octane, iso-octane, gasoline, cyclohexane, methyl cyclohexane, cycloheptane, cyclooctane, benzene, toluene, xylene, ethyl benzene and tetralin.

When the separation is complete, the magnesium dichloride and magnesium metal are treated with alkyl halides or aryl halides or mixtures of these to form an organometallic substance in situ. Representative but non-exhaustive examples of suitable halides for step (b) of the method of the present invention are allyl bromide, allyl chloride, benzyl bromide, benzyl chloride, 1-bromobutane, 2-bromobutane, 1-bromodecane, 2-bromodecane, bromoethane, 1-bromoheptane, 1-bromohexane, 1-bromopentane, 2-bromopentane, 1-bromopropane, 2-bromopropane, 1-chlorobutane, 2-chlorobutane, 1-chlorodecane 1-chlorooctane, 1-chloropropane, 2-chloropropane, 1-iodobutane, 1-iodopropane, 2-iodopropane, vinyl bromide, o-bromoanisole, m-bromoanisole, p-bromoanisole, 9-bromoanthracene, p-bromobenzamide, 4-bromotoluene, 2-bromo-p-xylene, 4-bromo-m-xylene, 2-bromo-p-xylene, 3-bromo-o-xylene, 4-bromo-o-xylene, chlorobenzene, cyclopentylbromide, cyclopentylchloride, and cyclopropylbromide.

In the preferred embodiment of the present invention excess halides above the level necessary for the reaction may be added to ensure complete reaction and to shorten reaction time. In addition, magnesium activating materials can be used, such as aluminum halides, aluminum halides in ether complexes, N,N-dimethylaniline, iodine and Grignard reagents. This activating reaction operates at temperatures of from about 20° C. to about 200° C., but preferably from about 20° C. to about 150° C.

Regardless of the use of a magnesium activating material, excess alkyl halides or aryl halides can be removed in step (b) and must be removed before step (d). This is usually accomplished by filtration followed by washing with inert hydrocarbon.

Transition metal alkoxides and/or siloxides which are contacted with the mixture of (b) contain no halogen ligands and include transition metals of Groups IVb, Vb, VIb, VIIb, VIII of Mendeleev's Periodic Table of Elements as set forth in *Handbook of Chemistry and Physics*, CRC, 48th Edition (1967-68). Such metals include, for example, titanium, chromium, ziroconium, vanadium, tungsten, manganese, molybdenum, ruthenium, rhodium, cobalt, and nickel; with titanium, vanadium and zirconium either separately or in combination being preferred. Representative but non-exhaustive examples of preferred transition metal alkoxide compounds and siloxide compounds useful alone or in combination are $Ti(OCH_2CH_3)_4$
$Ti(O\text{-}i\text{-propyl})_4$
$Ti(O\text{-}n\text{-propyl})_4$
$Ti(O\text{-}n\text{-butyl})_4$
$Ti(O\text{-sec-butyl})_4$
$TiCH_3(O\text{-}n\text{-hexyl})_3$
$Ti(CH_2CH_3)_2(O\text{-}n\text{-propyl})_2$
$Ti[CH_2(CH_2)_{18}CH_3](O\text{-}n\text{-dodecyl})_3$
$Ti(CH_2C_6H_5)_2(O\text{-}n\text{-hexyl})_2$
$Ti(cyclopentadiene)_2(OCH_3)_2$
$Ti(cyclopentadiene)(OCH_2CH_3)_3$
$Ti(OSi(butyl)_3)_2(O\text{-}i\text{-propyl})_2$
$Ti(OSi(CH_3)(CH_2CH_3)(C_6H_5))(O\text{-}n\text{-heptyl})_3$
$Ti(OSi(CH_3)_3)_4$
$Zr(O\text{-}i\text{-propyl})_4$
$Zr(O\text{-}n\text{-propyl})_4$
$Zr(OCH_3)_4$
$Zr(OCH_3)(OCH_2CH_3)_3$
$Zr(O\text{-}n\text{-butyl})_2(O\text{-}C_6H_5)_2$
$Ti(OSi(CH_2CH_3)_3)_4$
$Ti(OSi(i\text{-propyl})_3)_4$
$Ti(OSi(n\text{-propyl})_3)_4$
$Ti(OSi(sec\text{-butyl})_3)_4$
$TiCH_2CH_3(OSi(n\text{-hexyl})_3)_3$
$Ti(CH_3)_2(OSi(n\text{-dodecyl})_3)_2$
$Ti(cyclopentadiene)_2(OSi(CH_3)(C_2H_5)_2)_2$
$Zr(O\text{-}n\text{-butyl})_4$
$Zr(OSi(CH_3)_3)_4$
$CH_3Ti(O\text{-}i\text{-propyl})_3$
$CH_3Ti(O\text{-}i\text{-dodecyl})_3$
$Ti(O\text{-}i\text{-hexyl})_4$
$CH_3CH_2Ti(O\text{-}n\text{-butyl})_3$
$(cyclopentadiene)_2Ti(O\text{-}n\text{-hexyl})_2$
$(cyclopentadiene)Ti(OCH_3)_3$
$Ti(O\text{-}Si(CH_3)_2(CH_2CH_3))(O\text{-}n\text{-heptyl})_3$ In addition, a halogenating agent can be added to this mixture to further improve and activate the catalyst. Of the halogenating agents, chlorinating agents are preferred. Suitable chlorinating agents are compounds of chloride with a metal, organic group or hydrogen. The material used to halogenate the catalyst should preferably be a liquid, a gas, or soluble in a saturated aliphatic hydrocarbon solvent. Representative but non-exhaustive examples of such halogenating are methylaluminum dichloride, methylaluminum sesquichloride, isobutylaluminum dichloride, isobutylaluminum sesquichloride, ethylaluminum dichloride, diethylaluminum chloride, ethylaluminum sesquichloride, tin tetrachloride, silicon tetrachloride, hydrogen chloride, trichlorosilane, aluminum chloride, ethylboron dichloride, boron chloride, diethylboron chloride, chloroform, phosphorous trichloride, phosphorous oxychloride, acetyl chloride, thionyl chloride, sulfur chloride, methyl trichlorosilane, dimethyl dichlorosilane, titanium tetrachloride, vanadium tetrachloride, zirconium tetrachloride and vanadium trichloride.

The final step in the preparation of the catalyst of the present invention are adding alkylating agents (or co-catalysts) to form the polymerization catalyst. The term "alkylating agent" is used to indicate co-catalysts containing alkyl groups or aryl groups such as phenyl. These materials, such as phenyl magnesium bromide, can be used in the present invention. It is only necessary that a titanium-to-carbon bond be present. The presence of such bonds form the intended use of the term "alkylating agent".

These alkylating agents are organometallic compounds which are halides, hydrides, or totally alkylated derivatives of the metals of Groups Ia, IIa, IIb or IIIa of the Periodic Table such as, for example, triisobutyl aluminum, triethyl aluminum, diethylaluminum chloride, ethylmagnesium bromide, diisobutylaluminum hydride, mixtures thereof and the like, so as to provide a metal (Group Ia, IIa, IIb, or IIIa); transition metal atomic ratio of from about 1:1 to about 200:1, preferably from about 10:1 to about 30:1.

Aluminum alkyls are the preferred alkylating agents of the present invention followed closely by boron, magnesium and zinc alkyls. Other metals are likewise useful but are less preferred.

In the preparation of the catalyst of the present invention it is preferred to carry out such preparations in the presence of an inert diluent, although such is not necessary. Representative but non-exhaustive of suitable inert organic diluents are ethane, propane, isobutane, n-butane, n-hexane, isomeric hexanes, isooctane, isononane, paraffinic mixtures of alkanes having from 8 to 9 carbon atoms, cyclohexane, methyl cyclopentane, dimethylcyclohexane, dodecane, benzene, toluene, ethyl benzene, cumene, decalin, industrial solvents comprising saturated or aromatic hydrocarbons such as kerosene, naphthas, and mixtures of any of the foregoing, especially when free of impurities known to poison Ziegler catalysts. Especially useful are those inert diluents having boiling points in the range of $-50°$ C. to about 200° C.

The present invention is more concretely described with reference to the examples below wherein all parts and percentages are by weight unless otherwise specified. The examples are provided to illustrate the present invention and not to limit it.

EXAMPLE 1

A catalyst preparation is carried out wherein a transition metal is added to a formed Grignard reagent.

A composite powder (3.8378 grams), containing magnesium chloride and 6.63% magnesium metal, is placed in a 100 milliliter (ml) flask in the absence of air and water. Oxygen-free anhydrous hexane (40 ml) is placed in the flask and thoroughly agitated to form a slurry. The slurry is allowed to settle. One crystal of iodine ($I_2$) is placed in the flask in order to promote Grignard reagent formation. Freshly distilled 1-chlorobutane (1.10 ml) in 30 ml hexane is slowly added to the reaction flask over 30 minutes under an atmosphere of argon. The reaction is refluxed for 1 hour with vigorous stirring and then cooled to 2° C. under an atmosphere of dry argon. Titanium tetraisopropoxide (3.738 ml; 1.2 equivalent based on magnesium metal) is added to the slurried Girgnard reagent/$MgCl_2$ composite over 2.0 hours. The reaction is heated to reflux for 1 hour, then cooled to ambient temperature.

EXAMPLE 2

A catalyst preparation is carried out wherein a formed Grignard reagent is added to the transition metal compound.

A composite powder (5.153 grams), containing magnesium dichloride and 6.63% magnesium metal is placed in a 100 ml flask in the absence of air and water. Oxygen-free, anhydrous hexane (20 ml) is placed in the flask to form a slurry upon agitation. The slurry is allowed to settle. One crystal of iodine ($I_2$) is placed in the flask to promote the formation of the Grignard reagent. Freshly distilled 1-chlorobutane (1.70 ml) in 40 ml hexane is added to the reaction flask over 1.5 hours. The reaction is heated to reflux for 1.5 hours then cooled to 1° C. The slurry is added over 5 minutes, to a hexane (100 ml) solution of titanium tetraisopropoxide (4.93 ml; 1.2 equivalent based on magnesium metal) which has been cooled to 0° C. The resulting slurry is allowed to warm to ambient temperature over 15 minutes, then heated to reflux for 1.5 hours.

EXAMPLE 3

A catalyst preparation is carried out wherein a transition metal is added to a formed Grignard reagent.

A composite powder (3.8378 grams), containing magnesium chloride and 6.63% magnesium metal, is placed in a 100 ml flask in the absence of air and water. Oxygen-free anhydrous hexane (40 ml) is placed in the flask to form a slurry upon thorough agitation. The slurry is allowed to settle. One crystal of iodine ($I_2$) is placed in the flask in order to promote Grignard reagent formation. Freshly distilled 1-chlorobutane (1.10 ml) in 30 ml hexane is slowly added to the reaction flask over 30 minutes under an atmosphere or argon. The reaction is refluxed for 1 hour with vigorous stirring, then cooled to 2° C. under an atmosphere of dry argon. Titanium tetraisopropoxide (3.738 ml; 1.2 equivalent based on magnesium metal) is added to the slurried Grignard reagent/$MgCl_2$ composite over 2.0 hours. The reaction is heated to reflux for 1 hour, then cooled to ambient temperature. Ethylaluminum dichloride (50 ml; 25 wt. % in heptane) is added to the reaction mixture. The slurry is stirred vigorously for 30 minutes and allowed to settle at ambient temperature.

EXAMPLE 4

A catalyst preparation is carried out wherein a formed Grignard reagent is added to the transition metal compound.

A composite powder (5.1153 grams), containing magnesium dichloride and 6.6% magnesium metal is placed in a 100 ml flask in the absence of air and water. Oxygen-free, hydrous hexane (20 ml) is placed in the flask to form a slurry upon agitation. The slurry is allowed to settle. One crystal of iodine ($I_2$) is placed in the flask to promote the formation of the Grignard reagent. Freshly distilled 1-chlorobutane (1.70 ml) in 40 ml hexane is added to the reaction flask over 1.5 hours. The reaction is heated to reflux for 1.5 hours then cooled to 1° C. The slurry is added over a 5 minute period to a hexane (100 ml) solution of titanium tetraisopropoxide (4.93 ml; 1.2 equivalent based on magnesium metal) which has been cooled to 0° C. The resulting slurry is warmed to ambient temperature over 15 minutes, then heated to reflux for 1.5 hours. Ethyl aluminum dichloride (67 ml; 25 wt. % in heptane) is added to the resulting reaction mixture. This slurry is stirred vigorously for 30 minutes and then allowed to settle at ambient temperature.

In a polymerization process employing the catalyst of the present invention, polymerization is carried out by simply adding a catalytic amount of the catalyst component to a polymerization zone. The polymerization zone will normally be maintained at temperatures in the range of about 0° C. to about 300° C., preferably at a polymerization temperature of from about 30° C. to about 100° C. Normally the polymerization will be carried out for a period of time: ranging from about 5 minutes to several hours, generally from about 15 minutes to about 5 hours. Polymerizations should be carried out in the absence of moisture and oxygen, as these are known catalyst poisons. Catalytic amounts of the catalyst component is generally understood to be amounts ranging from about $1 \times 10^{-4}$ to about 1 mg atom of the transition metal per liter of diluent. The most advantageous catalyst concentrations depend, however, on polymerization conditions such as temperature, pressure, solvent and level of catalyst deactivators.

Polymerizations utilizing the catalyst of the present invention will normally be carried out at pressures of from about 0 to 500 pounds per square inch gauge (psig). Normally, the polymerization will occur in the presence of agitation to assure thorough contacting of the monomer with the catalyst.

Hydrogen can be used as known in the art in the practice of the present invention to control molecular weight of any resultant polymer. Normally hydrogen is used at levels of from about $1 \times 10^{-3}$ moles per mole of monomer to about 1 mole per mole of monomer. Hydrogen can be added with a monomer stream to the polymerization vessel or can be separately added to the vessel before, after or during addition of the monomer to the polymerization vessel. Hydrogen is normally added during or before addition of the catalyst.

EXAMPLE 5

The catalyst prepared in example 1 is used in a polymerization reaction. A stainless steel reactor is charged with 400 ml oxygen-free anhydrous hexane and 2.0 ml of aluminum triethyl (24.7% solution in heptane). The reactor is equilibrated to 60° C. under constant agitation and 115 psig gaseous ethylene. The polymerization is initiated by charging the catalyst (containing 0.055 mmoles titanium) to the reactor. After 1.0 hours the polymerization is terminated by disconnecting the ethylene feed to the reactor and removing the reactor from heat, followed by injecting 5.0 ml of isopropyl alcohol into the reactor. The polymer is isolated and dried.

Thus it can be seen that the present invention provides an improved method for preparing a catalyst for the polymerization of olefins. The method relys upon the reaction of magnesium metal with an organic halide or halides to yield a dialkyl magnesium composition, magnesium dihalide and unreacted magnesium metal, separating the magnesium dihalide and magnesium metal from the dialkyl magnesium composition, treating the magnesium dichloride and magnesium metal with alkyl halides or aryl halides to form an organometallic substance in-situ, then adding transition metal alkoxides and/or siloxides to the mixture, allowing reaction to occur and optionally removing any unreacted alkyl halides or aryl halides, followed by adding a co-catalyst to form the polymerization catalyst of the present invention.

While certain embodiments and details have been shown for the purpose of illustrating this invention, it will be apparent to those skilled in this art that various changes and modifications may be made herein without departing from the spirit or scope of the invention.

We claim:

1. A method for forming a supported activated catalyst for olefin polymerization comprising
   (a) contacting a mixture of magnesium metal and magnesium dihalide with alkyl halides or aryl halides or mixtures of these to form an organometallic substance in-situ;
   (b) contacting transition metal alkoxides, siloxides or mixtures of these with (a), then
   (c) adding alkylating agents to the product of (b) to form a polymerization catalyst, with the proviso that substantially all unreacted alkyl or aryl halides are removed before step (c).

2. A method for forming a supported activated catalyst for olefin polymerization comprising
   (a) reacting magnesium metal with at least one organic halide to yield a dialkyl magnesium composition, magnesium dihalide and unreacted magnesium metal;
   (b) separating the magnesium dihalide and magnesium metal from the dialkyl magnesium composition in the substantial absence of oxygen and moisture, then treating the magnesium dihalide and magnesium metal with alkyl halides or aryl halides or mixtures of these to form an organometallic substance in-situ;
   (c) contacting transition metal alkoxides, siloxides or mixtures of these with the mixture of (b) then
   (d) adding alkylating agents to form a polymerization catalyst, with the proviso that substantially all unreacted alkyl or aryl halides are removed before step (d).

3. A method as described in claim 2 wherein a chlorinating agent is added after (c).

4. A method as described in claim 3 wherein step (b) is carried out in the presence of excess alkyl halides or aryl halides or mixtures of these.

5. A method as described in claim 4 wherein the excess alkyl halides of (b) are normal or branched paraffin halides containing from 1 to 30 carbon atoms.

6. A method as described in claim 5 wherein the excess halides are alkyl halides.

7. A method as described in claim 6 wherein the halides of step (b) are selected from the group consisting of allyl bromide, allyl chloride, benzyl bromide, benzyl chloride, 1-bromobutane, 2-bromobutane, 1-bromodecane, 3-bromodecane, bromoethane, 1-bromoheptane, 1-bromohexane 1-bromopentane, 2-bromopentane, 1-bromopropane, 2-bromopropane, 1-chlorobutane, 2-chlorobutane, 1-iodobutane, 1-iodopropane, 2-iodopropane, vinyl bromide, o-bromoanisole, m-bromoanisole, p-bromoanisole, 9-bromoanthracene, 4-bromotoluene, 2-bromo-m-xylene, 4-bromo-m-xylene, 2-bromo-p-xylene, 3-bromo-o-xylene, 4-bromo-o-xylene, chlorobenzene, cyclopentylbromide, cyclopentylchloride, and cyclopropylbromide.

8. A method as described in claim 3 wherein after addition of the chlorinating agent a solid forms which is isolated.

9. A method as described in claim 8 wherein the isolated solid is washed with inert hydrocarbons.

10. A method as described in claim 3 wherein the transition metal alkoxide have the general formula $R_xM(OR)_y$ wherein each R is, independently, hydrogen, alkyl or silyl groups containing from 1 to 20 carbon atoms, aryl groups, aralkyl groups or alkaryl groups containing from 6 to 20 carbon atoms, x+y equals the valence of M, and M is a transition metal selected from the group consisting of titanium, chromium, zirconium, vanadium, tungsten, manganese, molybdenum, ruthenium, rhodium, cobalt and nickel.

11. A method as described in claim 10 wherein the transition metal alkoxides are selected from the group consisting of
   $Ti(OCH_2CH_3)_4$
   $Ti(O-i-propyl)_4$
   $Ti(O-n-propyl)_4$
   $Ti(O-n-butyl)_4$
   $Ti(O-sec-butyl)_4$
   $TiCH_3(O-n-hexyl)_3$
   $Ti(OSi(CH_3)_3)_4$
   $Ti(CH_2CH_3)_2(O-n-propyl)_2$
   $Ti[CH_2(CH_2)_{18}CH_3](O-n-dodecyl)_3$
   $Ti(CH_2C_6H_5)_2(O-n-hexyl)_2$
   $Ti(cyclopentadiene)_2(OCH_3)_2$
   $Ti(cyclopentadiene)(OCH_2CH_3)_3$
   $Ti(OSi(butyl)_3)_2(O-i-propyl)_2$
   $Ti(OSi(CH_3)(CH_2CH_3)(C_6H_5))(O-n-heptyl)_3$
   $Zr(O-i-propyl)_4$
   $Zr(O-n-propyl)_4$
   $Zr(OCH_3)_4$
   $Zr(OCH_3)(OCH_2CH_3)_3$
   $Zr(O-n-butyl)_2(O-C_6H_5)_2$
   $Ti(OSi(CH_2CH_3)_3)_4$
   $Ti(OSi(i-propyl)_3)_4$
   $Ti(OSi(n-propyl)_3)_4$
   $Ti(OSi(sec-butyl)_3)_4$
   $TiCH_2CH_3(OSi(n-hexyl)_3)_3$
   $Ti(CH_3)_2(OSi(n-dodecyl)_3)_2$
   $Ti(cyclopentadiene)_2(OSi(CH_3)(C_2H_5)_2)_2$
   $Zr(O-n-butyl)_4$
   $Zr(OSi(CH_3)_3)_4$
   $CH_3Ti(O-i-propyl)_3$
   $CH_3Ti(O-i-dodecyl)_3$
   $Ti(O-i-hexyl)_4$
   $CH_3CH_2Ti(O-n-butyl)_3$ (cyclopentadiene$_2$Ti(O-n-hexyl)$_2$ (cyclopentadiene)Ti(OCH$_3$)$_3$
   $Ti(O-Si(CH_3)_2(CH_2CH_3))(O-n-heptyl)_3$
   $Zr(OSi(n-propyl)_3)_4$
   $Zr(o-n-hexyl)_2(OSi(n-butyl)_3)_2$
   $Zr(O-i-butyl)(OSi(i-dodecyl)_3)_3$ 12. A method as described in claim 10 wherein the chlorinating agent added after (c) is selected from the group consisting of methylaluminum dichloride, methylaluminum sesquichloride, isobutylaluminum dichloride, isobutylaluminum sesquichloride, ethylaluminum dichloride, diethylaluminum chloride, ethyl-aluminum sesquichloride, tin tetrachloride, silicon tetrachloride, hydrogen chloride, trichlorosilane, aluminum chloride, ethylboron dichloride, boron chloride, diethylboron chloride, chloroform, phosphorus trichloride, phosphorus oxychloride, acetyl chloride, thionyl chloride, sulfur chloride, methyl trichlorosilane, dimethyl dichlorosilane, titanium tetrachloride, vanadium tetrachloride, zirconium tetrachloride and vanadium trichloride.

13. A method as described in claim 12 wherein the reaction of (a) takes place at a temperature of from about 20° C. to about 200° C.

14. A method as described in claim 13 wherein any excess alkyl or aryl halides are removed before step (d), followed by washing with inert hydrocarbons.

15. A method as described in claim 4 wherein the solids of (b) can be separated by filtration or decantation.

* * * * *

UNITED STATES PATENT AND TRADEMARK OFFICE
CERTIFICATE OF CORRECTION

PATENT NO. : 4,478,952
DATED : October 23, 1984
INVENTOR(S) : Mark P. Mack and Charles T. Berge It is certified that error appears in the above-identified patent and that said Letters Patent are hereby corrected as shown below:

Column 12, line 3, "4" should be --14--.

Signed and Sealed this

Seventh Day of May 1985

[SEAL]

Attest:

DONALD J. QUIGG

Attesting Officer     Acting Commissioner of Patents and Trademarks